US009094972B2

(12) United States Patent
Liu et al.

(10) Patent No.: US 9,094,972 B2
(45) Date of Patent: Jul. 28, 2015

(54) SENSING AIDING METHOD AND SYSTEM FOR COGNITIVE RADIO

(75) Inventors: Xing Liu, Shenzhen (CN); Feng Li, Shenzhen (CN); Li Zhang, Shenzhen (CN); Dong Zhou, Shenzhen (CN); Dongli Cheng, Shenzhen (CN)

(73) Assignee: ZTE CORPORATION (CN)

( * ) Notice: Subject to any disclaimer, the term of this patent is extended or adjusted under 35 U.S.C. 154(b) by 13 days.

(21) Appl. No.: 13/982,558

(22) PCT Filed: Nov. 30, 2011

(86) PCT No.: PCT/CN2011/083238
§ 371 (c)(1),
(2), (4) Date: Jul. 30, 2013

(87) PCT Pub. No.: WO2012/100597
PCT Pub. Date: Aug. 2, 2012

(65) Prior Publication Data
US 2013/0310062 A1 Nov. 21, 2013

(30) Foreign Application Priority Data

Jan. 30, 2011 (CN) .......................... 2011 1 0032932

(51) Int. Cl.
*H04W 72/00* (2009.01)
*H04W 72/04* (2009.01)
(Continued)

(52) U.S. Cl.
CPC .......... *H04W 72/0453* (2013.01); *H04W 16/14* (2013.01); *H04W 24/10* (2013.01)

(58) Field of Classification Search
CPC .. H04W 16/14; H04W 24/10; H04W 72/0453
USPC ......... 455/434, 120, 450, 455, 463, 444, 431; 370/328, 331, 491, 329, 500
See application file for complete search history.

(56) References Cited

U.S. PATENT DOCUMENTS 8,270,365 B2 * 9/2012 Jeong et al. ................... 370/331
8,787,907 B2 * 7/2014 Jain et al. ...................... 455/434
(Continued)

FOREIGN PATENT DOCUMENTS

CN 101296139 10/2008
CN 101588213 11/2009
(Continued)

OTHER PUBLICATIONS

International Search Report for International Patent Application No. PCT/CN2011/083238, mailed Mar. 8, 2012.

*Primary Examiner* — Babar Sarwar
(74) *Attorney, Agent, or Firm* — McAndrews, Held & Malloy, Ltd.

(57) ABSTRACT

The disclosure discloses a sensing aiding method for cognitive radio. The method includes the following steps. a high level node transmits configuration information to a base station; the base station combines with a subordinate node of the base station to perform frequency spectrum sensing measurement, in which the subordinate node has sensing capability, and feeds back a result of the sensing measurement to the high level node; and the high level node formulates a corresponding WS allocation policy according to the received result of the sensing measurement. The disclosure also discloses a system. By the method and the system of the disclosure, the high level node transmits the configuration information to the base station; the base station performs the spectrum sensing measurement in combination with the subordinate node having the sensing capability of the base station in a designated frequency band and feeds the result of the sensing measurement back to the high level node; and the high level node formulates the corresponding WS allocation policy according to the result of the sensing measurement. Available white band resources are acquired; the probability of base station configuration failure is reduced, and the overhead caused by configuration failures is reduced.

6 Claims, 8 Drawing Sheets

(51) Int. Cl.
   *H04W 16/14*       (2009.01)
   *H04W 24/10*       (2009.01)

(56) References Cited

U.S. PATENT DOCUMENTS

| | | | |
|---|---|---|---|
| 8,792,923 B2 * | 7/2014 | Kato | 455/509 |
| 2008/0247488 A1 * | 10/2008 | Li et al. | 375/299 |
| 2010/0246506 A1 * | 9/2010 | Krishnaswamy | 370/329 |
| 2011/0250858 A1 * | 10/2011 | Jain et al. | 455/120 |
| 2011/0312330 A1 * | 12/2011 | Sadek et al. | 455/452.2 |
| 2012/0052891 A1 * | 3/2012 | Irnich et al. | 455/501 |
| 2012/0307685 A1 * | 12/2012 | Kim et al. | 370/255 |

FOREIGN PATENT DOCUMENTS

| | | |
|---|---|---|
| CN | 101741486 | 6/2010 |
| CN | 101754381 | 6/2010 |
| CN | 101909302 | 12/2010 |
| WO | 2010003509 | 1/2010 |
| WO | WO 2010003509 A1 * | 1/2010 |

* cited by examiner

SENSING AIDING METHOD AND SYSTEM FOR COGNITIVE RADIO

TECHNICAL FIELD

The disclosure relates to the wireless communication field, in particular to a spectrum sensing aiding method for cognitive radio and a spectrum sensing aiding system for cognitive radio.

BACKGROUND

Along with the continuous progress of radio technology, a large number of various its radio services emerge. The spectrum resources which carry the radio services are limited; with the increasing demand of people on bandwidth, the spectrum resources show an extremely tense situation. On the other hand, in the conventional fixed spectrum allocation mode, the utilization rate of the spectrum resources is not high. A heavy business system can use the spectrum resources of a system, which takes a certain protection mechanism, with low spectrum utilization rate so that the spectrum resource utilization rate of an overall network is improved without interference on the system of which the spectrum resources is used by other system. This becomes a main means for solving a contradiction between the increasing demands and limited resources, and is a core idea of the cognitive radio technology.

For this, a secondary system is required to acquire the available spectrum resource information of a primary system reliably. In the present research of the cognitive radio technology, the white spaces resource information can be acquired by the system through accessing a high level node containing the white spaces resource information, or can be acquired by cognitive radio equipment through spectrum sensing. However, a single mode has respective limitation:

in the scheme of acquiring the white spaces resource information by the high level node, interference factors cannot be considered, so that the white spaces resources provided by the high level node cannot be used by the system, which applies white spaces, because of the factors of over-large interference and the like.

in the scheme of acquiring the white spectrum resource information by the cognitive radio equipment through the spectrum sensing, though the white spaces acquired by sensing is not occupied, but it cannot be known whether the white spaces is in the channel, which is not allowed to be used by a management region or is restricted to be used by a system operator to which the white spaces belongs. In this case, the access of the secondary system becomes illegal access.

Because of the limitation in the single mode, another means of using the two modes in combination is considered. In such a way, the requirements of the system to which the white spaces belongs and the management region cannot be violated, and the spectrum resources meeting the requirements of the system which sends the application can also be acquired. However, in the present combination scheme of high level node acquisition and sensing aiding, only the validity of single access can be ensured. For example, the high level node indicates that certain spectrum resources are available and allocates the spectrum resources to the cognitive radio equipment of the system which sends the application; but a sensing result shows that the spectrum resources are unavailable, that is very large interference may exist in the spectrum resources; and at this time, the cognitive radio equipment does not feed the sensing result back to the high level node or performs further sensing determination on an interference source; and therefore, the high level node cannot analyze the sensing result and performs relative interference adjustment, but performs resource acquisition and allocation process again to acquire new available white spaces resources. When a relative resource acquisition application exists, the high level node still can allocate the invalid spectrum resources as available resources, while the system which receives the allocated spectrum resources still cannot use the spectrum, so that unnecessary network overhead is increased.

SUMMARY OF THE INVENTION

In view of the above, in order to solve the problems above, the disclosure provides a sensing aiding method based on cognitive radio, which reduces the probability of base station configuration failure and reduces the overhead caused by configuration failures.

A sensing aiding method for cognitive radio includes: a high level node transmits configuration information to a base station; the base station combining with a subordinate node of the base station to perform frequency spectrum sensing measurement, wherein the subordinate node has sensing capability, and feeding back a result of the sensing measurement to the high level node; and the high level node formulating a corresponding WS allocation policy according to the received result of the sensing measurement.

In the above, the configuration information includes information of WS resources of the base station, or the information of the WS resources of the base station and co-channel and adjacent-channel system information of WS.

The WS resources refer to unoccupied frequency spectrum resources; the information of the WS resources includes a frequency point, bandwidth, transmitting parameter requirements and sensing measurement threshold information; and the co-channel or adjacent-channel system information of the WS includes pilot information of a system and modulating and coding mode information of the system, in which the system occupies co-channel and adjacent-channel resources of the WS.

The frequency spectrum sensing measurement is that: the base station judging whether the WS resources meet a threshold value preset by the base station and determining whether the WS resources are available.

Preferably, the step of the high level node transmitting the configuration information to the base station, the base station combining with the subordinate node of the base station to perform frequency spectrum sensing measurement, wherein the subordinate node has sensing capability, and the base station feeding back the result of the sensing measurement to the high level node includes that: the high level node transmitting the configuration information to the base station, which contains the information of the WS resources of the base station, and the co-channel and adjacent-channel system information of the WS; and the base station combining with the subordinate node of the base station to perform the sensing measurement, in which the subordinate node has sensing capability, judging whether the WS resources are available, further judging an interference source when the WS resources are unavailable, and feeding the result of the sensing measurement back to the high level node; or the high level node transmitting the configuration information, which contains the information of the WS resources to the base station; the base station combining with the subordinate node of the base station to perform the sensing measurement, wherein the subordinate node has sensing capability, determining whether the WS resources are available, and feeding back the result of the sensing measurement to the high level node; if the WS resources are unavailable, the high level node further transmitting the configuration information, which contains the con-channel and adjacent-channel system information of the WS, to the base station, and the base station combining with the subordinate node of the base station to perform the sensing measurement to determine information of the interference source, and feeding back the information of the interference source back to the high level node, wherein the subordinate node has the sensing capability; and the interference source is an adjacent-channel interference in the same region or an co-channel interference in adjacent regions.

The result of the sensing measurement includes: availability of the WS resources or unavailability of the WS resources, and the information of the interference source.

Preferably, the step of formulating the corresponding WS allocation policy includes when the WS resources which are allocated are unavailable, the high level node coordinating the interference source related by the frequency spectrum allocation policy formulated by the high level node according to the information of the interference source provided by the result of the sensing measurement; and the base station continuing using the WS resources which are allocated; or Transmitting new information of the WS resources to the base station, and allocating new WS resources to the base station; or when an interference on the WS is an unexpected interference and the information of the interference source cannot be distinguished, the high level node storing the information of the interference source and reducing a priority level for allocating the resources on the base station in subsequent resources allocation.

In the above, the result of the sensing measurement includes unavailability of the WS resources and interference source information.

Preferably, the step of the high level node coordinating the interference source related by the frequency spectrum allocation policy formulated by the high level node according to the information of the interference source provided by the result of the sensing measurement; and the base station continuing using the WS resources which are allocated is embodied as: if the information of the interference source is indeed from a co-channel and adjacent-channel systems, the high level node transmitting a transmitting parameter changing command to an interference source base station which causes an WS interference; the interference source base station executing the command of the high level node and feeding back a transmitting parameter changing command response to the high level node; and the high level node retransmitting a command of allocating the original WS resources continuously to the base station which transmits a resource application, wherein the transmitting parameter changing command limits transmitting power of the transmitting parameter changing command or changes one or more antenna parameters.

Preferably, the new information of the WS resources includes one or more frequency points of the reallocated WS resources, one or more bandwidths of the reallocated WS resources, sensing measurement threshold information of the reallocated WS resources and one or more transmitting parameter requirements of the reallocated WS resources.

The invention also provides a sensing aiding system for cognitive radio, comprising: a high level node and a base station, wherein the high level node, is configured to transmit configuration information to the base station, and formulate a corresponding WS allocation policy according to a result of frequency spectrum sensing measurement fed back by the base station; and the base station is configured to combine with a subordinate node of the base station to perform the frequency spectrum sensing measurement and feed back the result of the frequency spectrum sensing measurement to the high level node, wherein the subordinate node has sensing capability.

The high level node further includes a configuration module and a allocation policy module, wherein the configuration module is configured to configure WS resources to the base station according to an application of the WS resources transmitted by the base station, the information of the WS resources stored by the base station, and the WS allocation policy, and feed back the WS resources to the base station, wherein the configuration information includes the information of the WS resources of the base station, or the information of the WS resources of the base station and co-channel or adjacent-channel system information of the WS; and the allocation policy module is configured to formulate the corresponding white spaces allocation policy according to the result of the frequency spectrum sensing measurement fed back by the base station.

Preferably, when the allocated WS resources are unavailable, the corresponding WS allocation policy formulated by the allocation policy module, the allocation policy module transmitting the new WS resource information to the base station, and allocating the new white spaces resources to the base station; or when interference information is from a co-channel and adjacent-channel systems, the high level node transmitting a transmitting parameter changing command to an interference source base station which causes an WS interference; the interference source base station executing the command of the high level node and feeding back a transmitting parameter changing command response to the high level node; and the high level node retransmitting a command of allocating the original WS resources continuously to the base station which transmits a resource application, wherein the interference source information is included in the result of the sensing measurement; and the transmitting parameter changing command limits transmitting power of the transmitting parameter changing command or changes one or more antenna parameters; or when an interference on the WS is an unexpected interference and the information of the interference source cannot be distinguished, the high level node storing the information of the interference source and reducing a priority level for allocating the resources on the base station in subsequent resources allocation.

Preferably, the base station also includes a sensing measurement module and a feedback module, wherein the sensing measurement module is configured to combine with the subordinate node of the base station to perform the sensing measurement, judge whether the WS resource meet a threshold value preset by the base station, and determine whether the WS resources are available, wherein the subordinate node has sensing capability; and the feedback module is configured to feed the result of the frequency spectrum sensing measurement to the high level node, wherein the frequency spectrum sensing measurement is performed by the base station combining with the subordinate node, having the sensing capacity, of the base station.

Preferably, the result of the sensing measurement of the sensing measurement module includes: availability of the WS resources or unavailability of the WS resources, and the information of the interference sources.

In the disclosure, the high level node transmits the configuration information to the base station; the base station combines with a subordinate node of the base station to perform frequency spectrum sensing measurement, in which the subordinate node has sensing capability, and feeds back the result of the sensing measurement to the high level node; and the high level node formulates the corresponding WS allocation policy according to the received result of the sensing measurement. Available white spaces resources are acquired, the probability of base station configuration failure is reduced; and the overhead caused by configuration failures is reduced.

DETAILED DESCRIPTION OF EMBODIMENTS

In the disclosure, the high level node transmits the configuration information to the base station; the base station combines with a subordinate node of the base station to perform the frequency spectrum sensing measurement, in which the subordinate node has sensing capability, and feeds back the result of the sensing measurement to the high level node; and the high level node formulates a corresponding WS allocation policy according to the received result of the sensing measurement.

The technical solution of the disclosure will be described hereinafter in detail in conjunction with the drawings and the embodiments.

Figure 1:
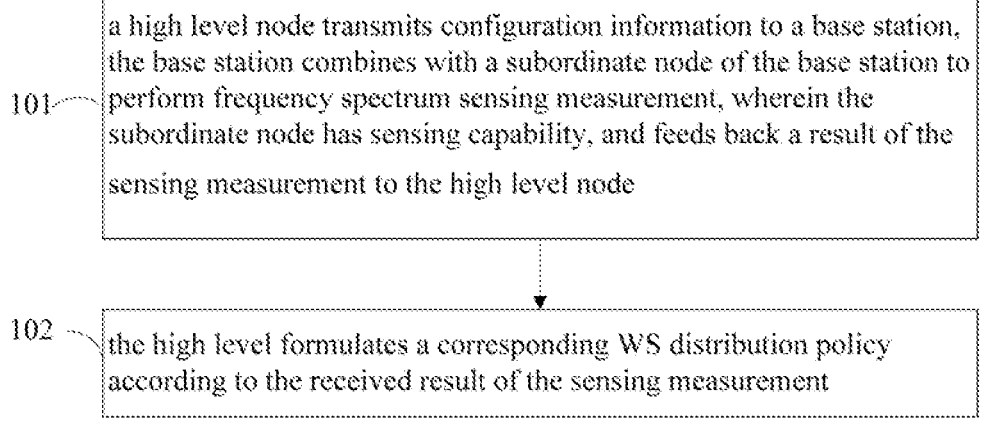
FIG. 1 shows the flow schematic diagram of a sensing aiding method for cognitive radio according to the disclosure.

FIG. 1 shows a flow chart of a sensing aiding method for cognitive radio according to the disclosure. As shown in FIG. 1, the method includes the following steps.

Step 101: a high level node transmits configuration information to a base station, the base station combines with a subordinate node of the base station to perform frequency spectrum sensing measurement, wherein the subordinate node has sensing capability, and feeds back a result of the sensing measurement to the high level node.

Specifically, the configuration information includes information of WS resources of the base station, or the information of the WS resources of the base station and co-channel and adjacent-channel system information of the WS. The WS resources refer to the unoccupied spectrum resources; the information of the WS resources includes: a frequency point, bandwidth, transmitting parameter requirements and sensing measurement threshold information; and the co-channel and adjacent-channel system information of the WS includes: pilot information of a system, and modulating and coding mode information of the system, in which the system occupies the co-channel and adjacent-channel resources of the WS. The frequency spectrum sensing measurement is that: the base station judging whether the WS resources meet a threshold value preset by the base station and determining whether the WS resources are available. The result of the sensing measurement includes: availability of the WS resources, or unavailability of the WS resources and the information of the interference source.

The step, which is the high level node transmits the configuration information to the base station, the base station combines with a subordinate node of the base station to perform the frequency spectrum sensing measurement, wherein the subordinate node has sensing capability, and feeds back a result of the sensing measurement to the high level node, includes that: the high level node transmits the configuration information to the base station, which contains the information of the WS resources of the base station and the co-channel and adjacent-channel system information of the WS, and the base station combines with a subordinate node of the base station to perform the sensing measurement, wherein the subordinate node has sensing capability, judges whether the WS resources are available, further judges an interference source when the WS resources are unavailable, and feeds the result of the sensing measurement back to the high level node; or the high level node transmits the configuration information, which contains the information of the WS resources to the base station, the base station combines with the subordinate node of the base station to perform the sensing measurement, wherein the subordinate node has sensing capability, determines whether the WS resources are available, and feeds back the result of the sensing measurement to the high level node; if the WS resources are unavailable, the high level node further transmits the configuration information, which contains the con-channel and adjacent-channel system information of the WS, to the base station, and the base station combines with the subordinate node of the base station to perform the sensing measurement to determine information of the interference source, and feeds back the information of the interference source to the high level node, wherein the subordinate node has the sensing capability in the above, the interference source is an adjacent-channel interference in the same region or an co-channel interference in adjacent regions.

Step 102, the high level formulates a corresponding WS allocation policy according to the received result of the sensing measurement.

Specifically, the step of formulating the corresponding WS allocation policy includes that: when the allocated WS resources are unavailable, the high level node coordinates the related interference source by the frequency spectrum allocation policy formulated by the high level node according to the information of the interference source provided by the result of the sensing measurement; and the base station continues using the allocated WS resources; or the new information of the WS resources is transmitted to the base station, and the new WS resources are allocated to the base station; or when an interference on the WS is an unexpected interference and the information of the interference source cannot be distinguished, the high level node stores the information of the interference source and reduces a priority level for allocating the resources on the base station in subsequent resources allocation; the step, which is the high level node coordinates the related interference source by the frequency spectrum allocation policy formulated by the high level node according to the information of the interference source provided by the result of the sensing measurement, and the base station continues using the allocated WS resources, is embodied as: if the information of the interference source is indeed from a co-channel and adjacent-channel system, the high level node transmits a transmitting parameter changing command to an interference source base station which causes an WS interference; the interference source base station executes the command of the high level node and feeds back a transmitting parameter changing command response to the high level node; and the high level node retransmits a command of allocating the original WS resources continuously to the base station which transmits a resource application, wherein the transmitting parameter changing command limits transmitting power or changes one or more antenna parameters; and the new information of the WS resources includes a frequency point of the reallocated WS resources, bandwidth of the reallocated WS resources, sensing measurement threshold information of the reallocated WS resources and one or more transmitting parameter requirements of the reallocated WS resources.

Figure 2:
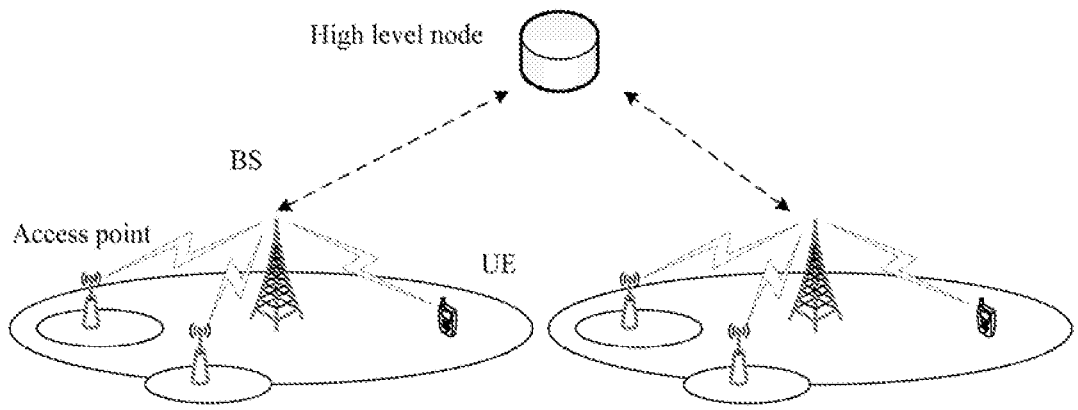
FIG. 2 shows an application scene schematic diagram corresponding to the disclosure.

FIG. 2 shows an application scene corresponding to the disclosure: as shown in FIG. 2, the application scene involves the followings network elements: a high level node and a base station, wherein the high level node includes a frequency spectrum service condition of an authorization system being local or of a plurality of regions including the local, wherein the service condition includes but is not limited to the information of the frequency point, working bandwidth, coverage, possible duration of the WS, and allowed maximum transmitting power and the like; meanwhile, the high level node also includes service condition of the secondary system on the WS of the authorization system spectrum, which includes but is not limited to the information of the frequency point, working bandwidth and the like; the high level node is a network node with a learning function and is responsible for providing WS information, such as a Geo-location Database in ETSI RRS or a Central Control Point (CCP). The high level node can coordinate the corresponding interference source according to the information of the interference source, which is in the result of the sensing measurement fed back by a low level node, and formulate the corresponding frequency spectrum allocation policy.

The Base Station (BS) can be directly connected with the high level node. The functions of the BS includes but is not limited to the followings: 1, acquiring the information of the WS from the high level node and the co-channel or adjacent-channel system information; 2, performing the frequency spectrum sensing measurement, including determining whether the allocated frequency spectrum is available and distinguishing the interference source; 3, feeding back the result of the sensing measurement to the high level node; 4, allocating the acquired WS resources to each wireless link which is connected with the BS; and 5, changing or adjusting one or more parameters, such as a modulation type and the transmitting power, of the radio technology.

Figure 3:
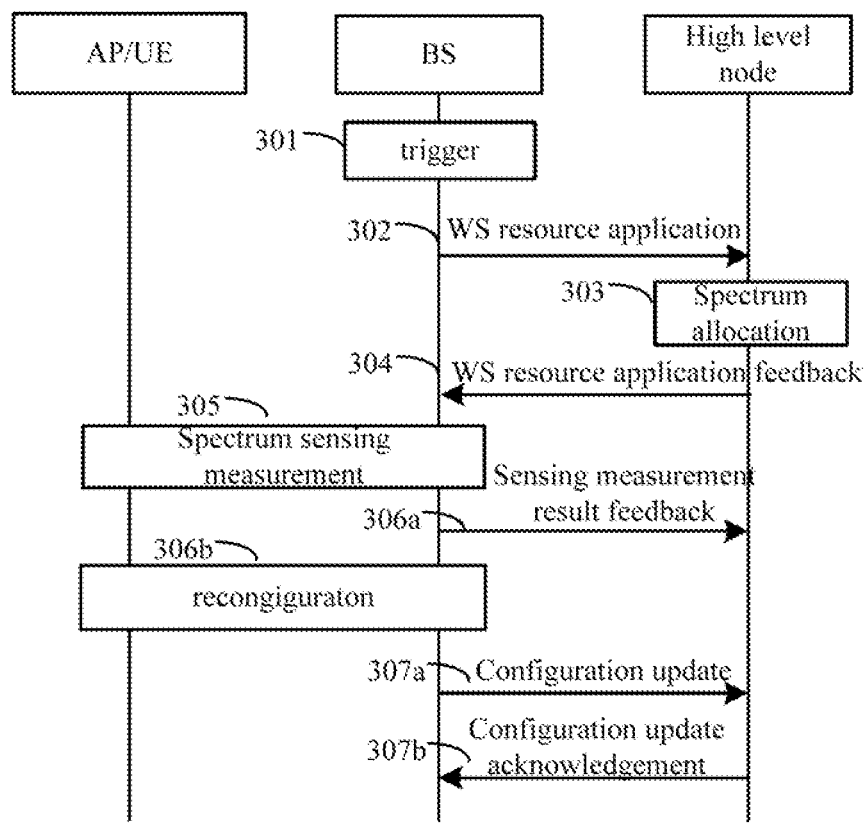
FIG. 3 shows a corresponding signalling flow chart when the acquired WS resources are available in the method embodiments 1 and 2.

Method embodiment 1: the signalling flow when the acquired WS resources are available is shown as FIG. 3; and the signalling flow is described below in detail.

Step 301: a BS triggers to borrow WS resources.

Specifically, the reason for triggering can be that the communication quality of a downlink of the BS cannot meet the Quality of Service (QoS) or the overload is over heavy and the like.

Step 302: the BS transmits a WS resource application to the high level node.

Step 303: the high level node determines the radio frequency spectrum resources allocated to the BS according to the WS resource application transmitted by the BS and the WS information stored by the BS;

Step 304: the high level node transmits the WS resource application feedback to the BS.

Specifically, the WS resource application feedback includes the WS resources allocated to the BS, the transmitting parameter requirements on the spectrum, measurement configuration information, such as co-channel and adjacent-channel system information of the WS resources, and a sensing measurement threshold The transmitting parameter requirements include but are not limited to the allowed maximum transmitting power and the like.

The co-channel and adjacent-channel system information refers to the system information which in adjacent regions occupies the same spectrum as the WS, and the adjacent-channel resource system information of the WS occupied in the local region; the system information includes but is not limited to pilot information, modulating mode information, coding mode and the like.

The measurement configuration information can be acquired as follows. a network node (for example, the Geo-location in the ETSI RRS), which stores the primary and secondary system information, in high level nodes transmits the measurement configuration information to the CCP of the system (for example, the CCP in the ETSI RRS), and the CCP transmits the measurement configuration information to the BS; or the measurement configuration information can be acquired by the interaction among CCPs and is transmitted to the BS.

The sensing measurement threshold is used for judging whether the WS is available, namely when the interference is higher than the preset sensing measurement threshold $T_1$, the WS is unavailable.

Step 305: the BS and the subordinate node of the BS perform the frequency spectrum sensing measurement on the WS allocated by the high level node to determine whether the acquired spectrum is available, wherein the subordinate node has the sensing capability.

Specifically, the BS and its subordinate node having the sensing capability of the BS have the capacity of distinguishing the interference source; the BS and its subordinate its node having the sensing capability can sense the interference power or energy of the acquired WS in advance; when the interference is over-large and does not meet a BS configuration requirement, namely the acquired WS is unavailable, the interference source distinguishing measurement is further performed, for example, characteristic detection is performed according to the co-channel and adjacent-channel system information acquired from the high level node so as to distinguish the source of the interference.

The embodiment describes the signalling flow when the allocated WS resources are available. The situation that the allocated WS resources are unavailable is described in the embodiments below in detail.

Step 306: if the result of the sensing measurement is that the spectrum is available, the BS initiates the reconfiguration of the radio link between the BS and the subordinate node of the BS according to the transmitting parameter requirement in the feedback message of the high level node in the Step 304, namely Step 306b in the diagram; and the BS feeds back the result of the frequency spectrum sensing measurement to the high level node, namely Step 306a in the diagram; and Step 307: after the completion of the configuration, the BS feeds back a configuration updating message to the high level node, namely Step 307a in the diagram; and the high level node feeds back a configuration update acknowledgement message, namely Step 307b in the diagram.

Method embodiment 2: another signalling flow when the acquired spectrum resources meet the communication requirement of the BS is shown as FIG. 3; the signalling flow in the method embodiment is the same as that in the method embodiment 1; the difference is the contents of the feedback information transmitted by the high level node in Step 304 and the frequency spectrum sensing measurement performed in Step 305; the method embodiment 2 is described as below in detail:

Step 304: a high level node transmits the WS resource application feedback to a BS, wherein the WS resource application feedback only includes the WS resource information allocated to the BS;

the WS resource information includes but is not limited to the information of a to frequency paint, bandwidth, transmitting parameter requirements, sensing measurement threshold $T_1$ and the like;

Step 305: the BS performs the frequency spectrum sensing measurement on the WS allocated by the high level node in combination with the subordinate node having the sensing capability of the base station to determine whether the acquired WS is available; and at this time, the frequency spectrum sensing measurement does not need to distinguish the interference source; if the result of the sensing measurement shows that the allocated WS resources are available, the BS initiates corresponding reconfiguration; and if the result of the sensing measurement shows that the allocated WS resources are unavailable, the BS waits the co-channel and adjacent-channel system information from the high level node after feeding back the result of the sensing measurement to the high level node so as to further perform the sensing measurement for distinguishing the interference source. The situation that the allocated WS resources are unavailable is described in the embodiments below in detail.

Figure 4:
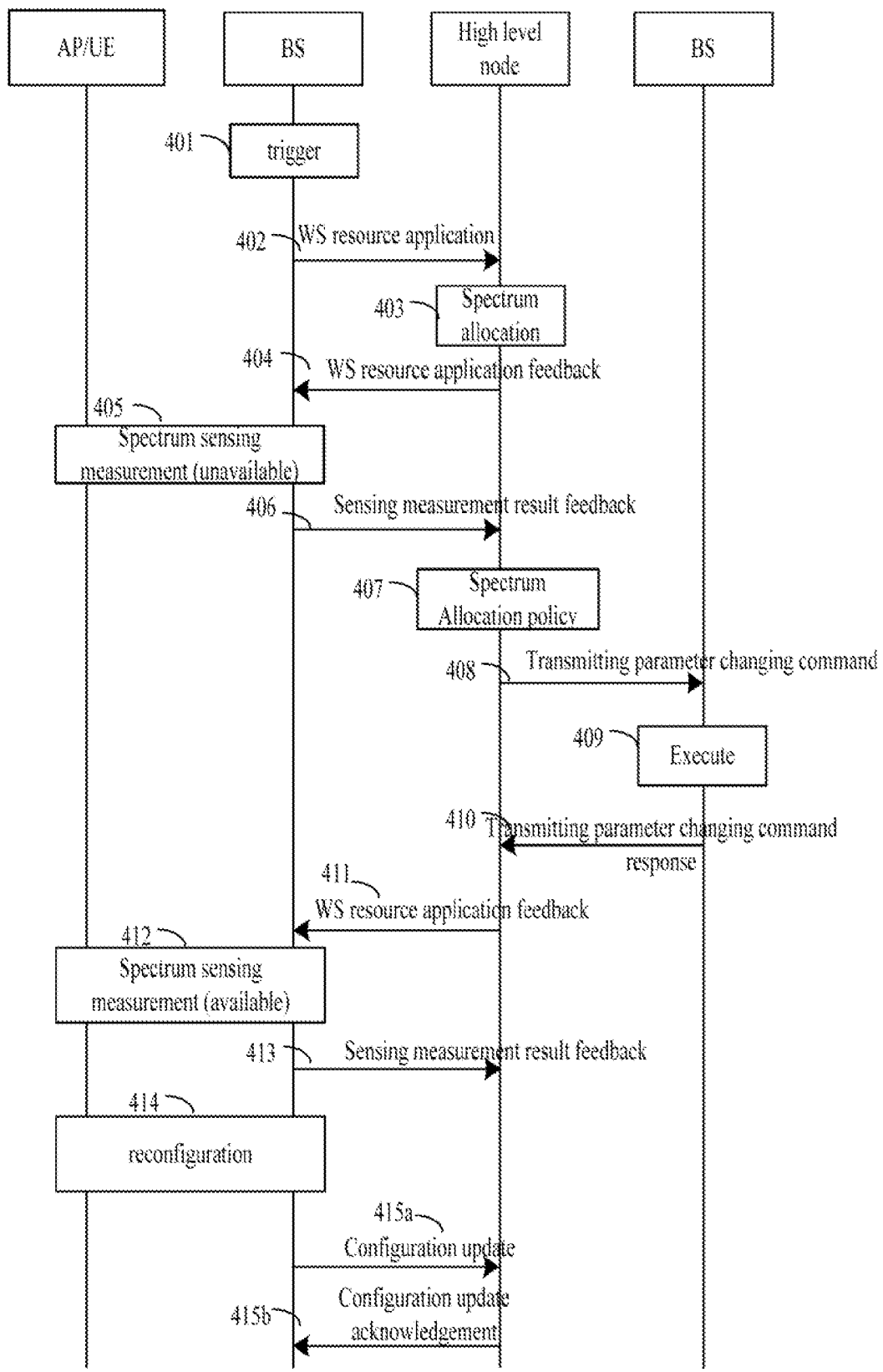
FIG. 4 shows a signalling flow chart corresponding to the high level node adjusting the base station when the acquired WS resources are unavailable in the method embodiment 3.

Method embodiment 3: when the acquired WS resources are unavailable, the signalling flow chart of the high level node adjusting the base station is shown as FIG. 4. The first five steps of the embodiment are the same as those of the embodiment 1, and no further description is needed. The embodiment 3 is described in detail from the sixth step.

Step 406: the BS feeds back the result of the sensing measurement to the high level node.

Specifically, the result of the sensing measurement includes that the WS is available ort not; and when the WS is unavailable, the result of the sensing measurement further includes the interference source information of the spectrum.

In the embodiment, the result of the primary sensing measurement shows that the WS is unavailable, the BS performs further sensing measurement in combination with the subordinate node having the sensing capacity of the BS according to the co-channel and adjacent-channel information contained in the WS resource application feedback message of the high level node so as to distinguish the interference source;

Step 407: the high level node formulates a spectrum allocation policy according to the result of the sensing measurement.

At this time, the high level node formulates the spectrum allocation policy according to the result of the sensing measurement (the interference source information) fed back by the BS;

Step 408: the high level node transmits a transmitting parameter changing command to the interference source BS which causes the WS interference.

Specifically, the interference source can be the adjacent-channel interference in the same region, or the co-channel interference in adjacent regions; and the transmitting parameter changing command can be for limiting the transmitting power of the interference source and the like.

Step 409: the interference source BS executes the command of the high level node and reduces the transmitting power on the WS;

Step 410: after the completion of the execution, the transmitting parameter changing command response is fed back to the high level node;

Step 411: the high level node retransmits the WS resource application feedback to the BS which transmits the resource application.

In the embodiment, the high level node continues allocating the original WS to the BS.

Step 412: the BS performs the sensing measurement on the allocated WS resources again in combination with the subordinate node having a sensing measurement function of the BS;

Step 413: because the transmitting power is reduced by the interference resource; the result of the sensing measurement shows that the WS is available, and the result of the sensing measurement is fed back to the high level node;

Step 414: the BS initiates the reconfiguration of the radio link between the BS and the subordinate node of the BS according to the transmitting parameter requirements in the feedback message of the high level node in Step 404; and Step 415: after the completion of the configuration, the configuration updating message is fed back to the high level node; and the high level node feeds back the configured updating acknowledgment message.

Figure 5:
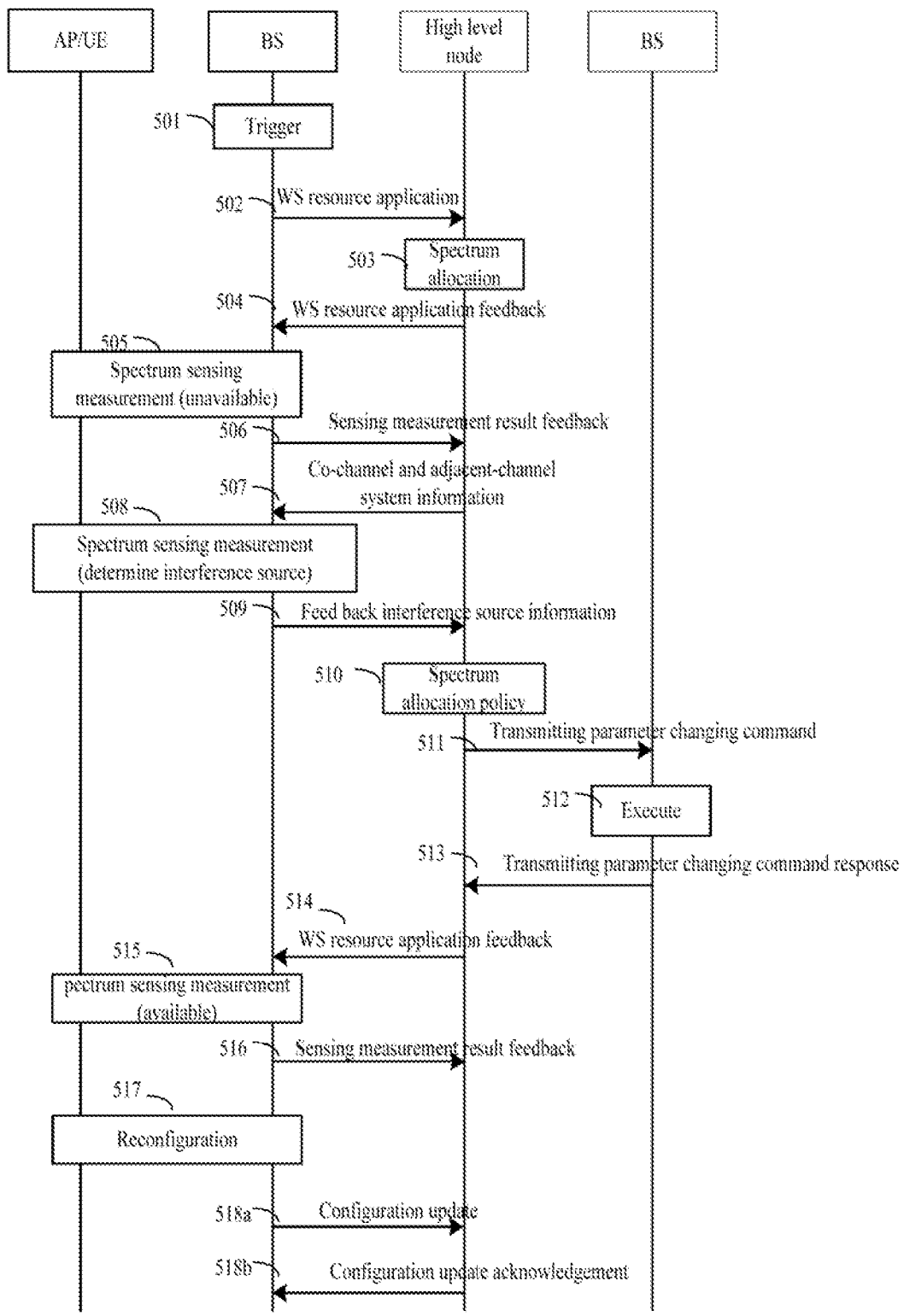
FIG. 5 shows another signalling flow chart corresponding to the high level node adjusting the base station when the acquired WS resources are unavailable in the method embodiment 4.

Method embodiment 4: when the acquired WS is unavailable, the another signalling flow of the high level node adjusting the base station is shown as FIG. 5; the method embodiment is similar to the method embodiment 3: because the configuration information contained in the message transmitted to the BS which applies the resources by the high level node in the first four steps in the embodiment is different from the configuration information contained in the message transmitted to the BS which applies the resources by the high level node in the method embodiment 3, the flows for determining the interference source are different; and the embodiment is described below in detail.

Step 504: the high level node transmits the WS resource application feedback to the BS, wherein the WS resource application feedback only includes the WS resource information allocated to the BS, Specifically, the WS resource information includes but is not limited to the information of frequency point, bandwidth, transmitting parameter requirements, sensing measurement threshold $T_1$ and the like.

Step 505: the BS performs the frequency spectrum sensing measurement on the WS allocated by the high level node in combination with the subordinate node having the sensing capability of the base station to determine whether the acquired WS is available.

Specifically, only the availability of the allocated WS resources is fed back; and the interference source does not need to be distinguished in the frequency spectrum sensing measurement;

Step 506: if the result of the sensing measurement shows that the allocated WS resources are unavailable, the BS waits the co-channel and adjacent-channel system information from the high level node after feeding back the result of the sensing measure to the high level node so as to perform the sensing measurement for distinguishing the interference source.

Step 507: the high level node transmits the co-channel and adjacent-channel system information of the WS resource to the BS;

Step 508: the frequency spectrum sensing measurement is different from the previous frequency spectrum sensing measurement, and the interference source needs to be distinguished aiming at the characteristics of a co-channel and adjacent-channel system transmitted by the high level node;

Step 509: the BS feeds back the interference information to the high level node.

if the interference is indeed caused by the co-channel or adjacent-channel system, continue to execute the flows after Step 407 of the embodiment 3.

Figure 6:
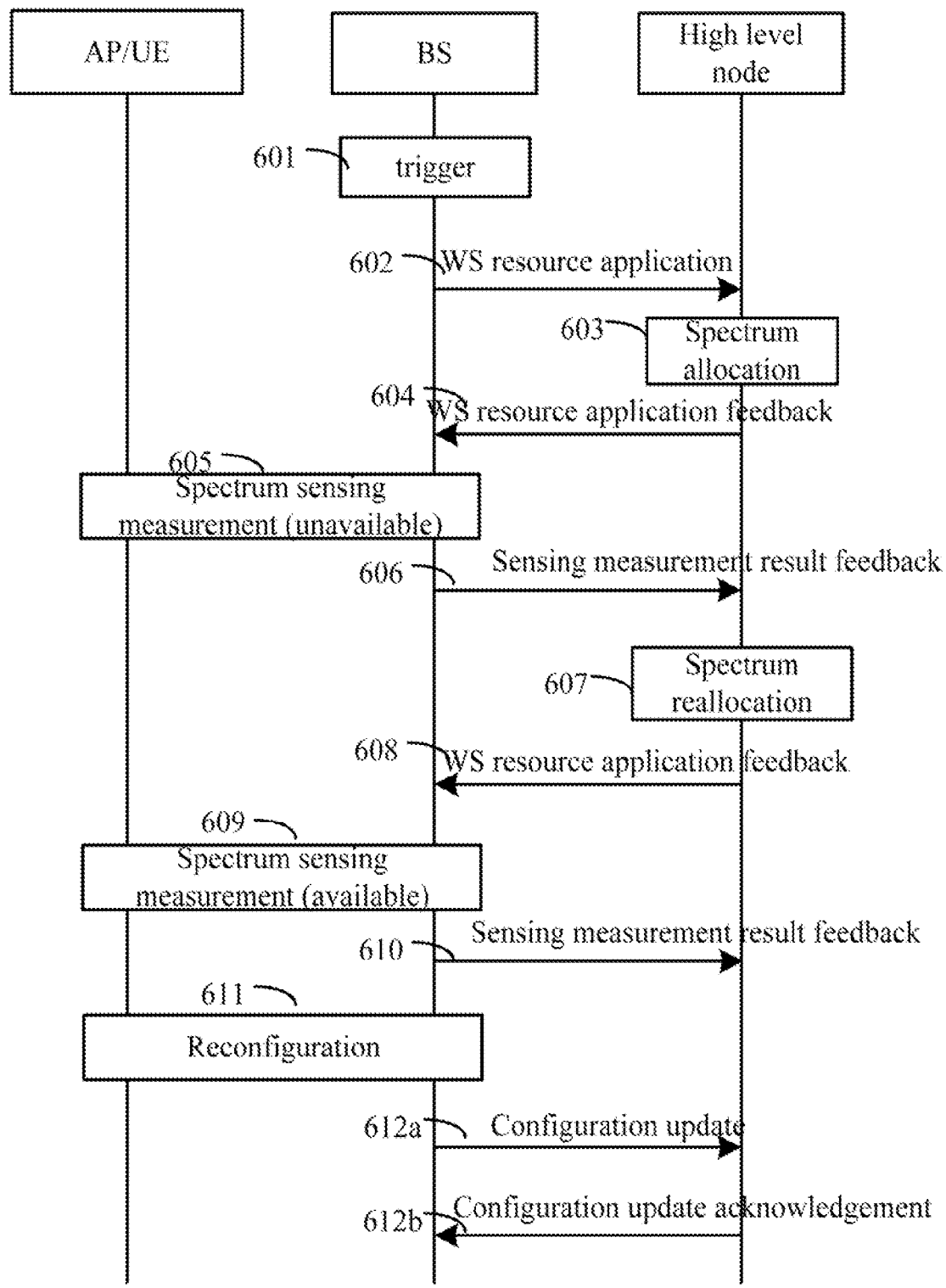
FIG. 6 shows a signalling flow chart corresponding to the reallocated frequency spectrum resources of the high level node when the acquired WS resources is unavailable in the method embodiment 5.

Method embodiment 5: when the acquired WS resources are unavailable, the signalling flow corresponding to the reallocated frequency spectrum resources of the high level node is shown as FIG. 6; the first sixth steps are the same as those in the method embodiment 3, no further description is needed; and the following steps are described in detail.

Step 607: the high level node formulates a spectrum allocation policy after receiving the result of sensing measurement, and reallocates the WS resources to the BS.

Specifically, the result of the sensing measurement includes the availability of the WS resources; and when the WS resources are unavailable, the result of the sensing measurement further includes the interference source information.

The reason for making the decision of reallocating the spectrum resources by the high level node in the embodiment can be that the interference source cannot be determined, namely the reason can be caused by the unexpected interference (such as industrial interference and the like); or the subordinate BS has urgent requirements on the spectrum, the high level node allocates the new resources first and then processes the interference source so as to facilitate thereafter allocation. Aiming at the situation that the interference source cannot be distinguished, namely when the interference on the WS is an unexpected interference, the high level node stores the information and reduces the priority level for allocating the frequency band on the base station in subsequent resource allocation.

Step 608: a WS resource application feedback is transmitted to the BS, wherein the WS resource application feedback includes the reallocated WS information, the sensing measurement threshold information, and the transmitting parameter requirements and the like.

Thereafter, the BS repeats the frequency spectrum sensing measurement flow of Step 605, feeds back the result of the sensing measurements until obtaining the available WS resources from the high level node, reallocates the WS resources, and transmits a configuration updating message to the high level node; and the high level node replies a configuration update acknowledgement message.

Figure 7:
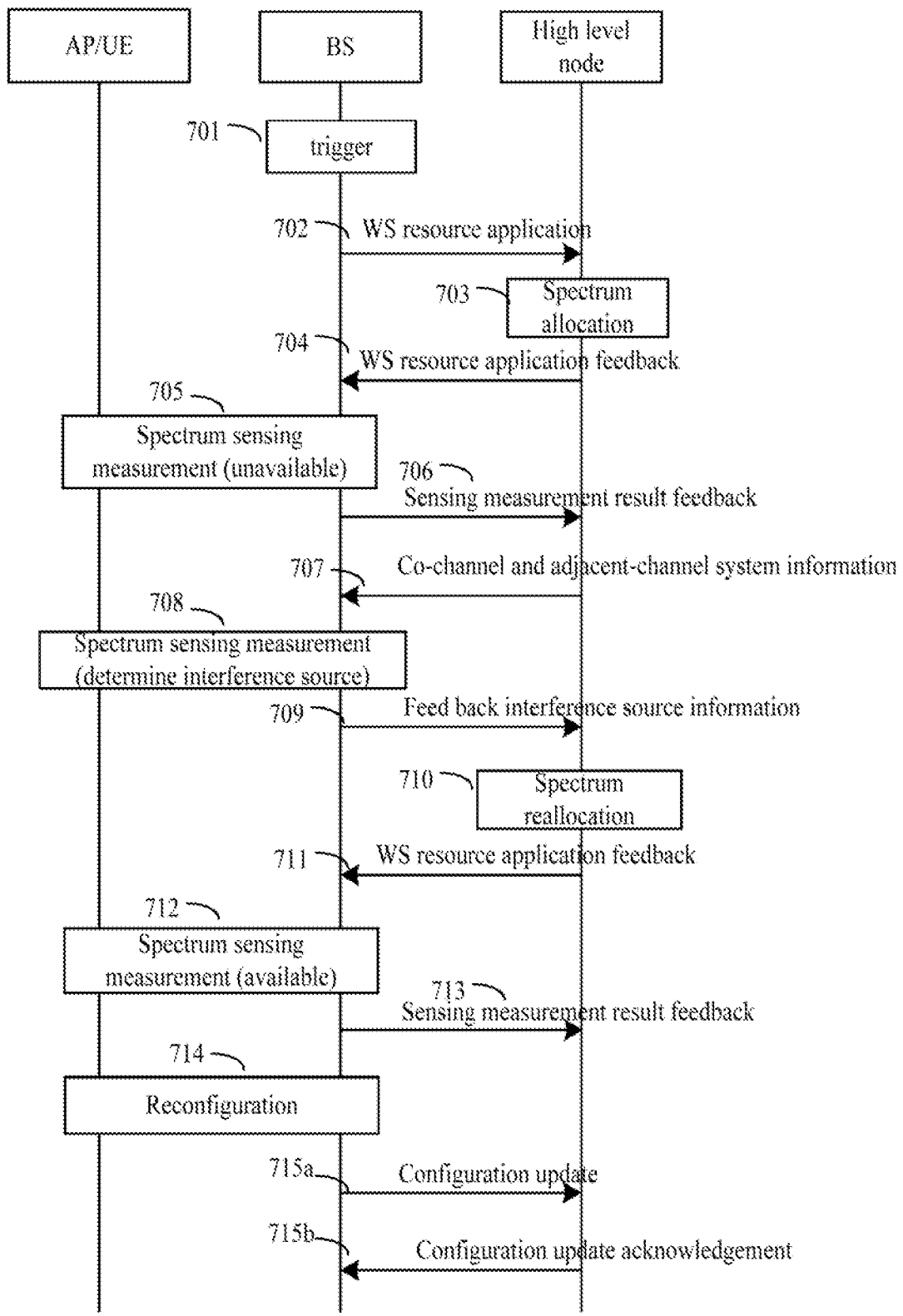
FIG. 7 shows another signalling flow chart corresponding to the reallocated frequency spectrum resources of the high level node when the acquired WS resources is unavailable in the method embodiment 6.

Method embodiment 6: when the acquired WS resources are unavailable, another signalling flow corresponding to the reallocated frequency spectrum resources of the high level node is shown as FIG. 7; the method embodiment 6 is the combination of the method embodiment 4 and the method embodiment 5, namely the first nine steps in the method embodiment 6 and in the method embodiment 4 are the same; the steps after the ninth step in the method embodiment 6 are the same as that of the steps after the seventh step in the method embodiment 5. In this embodiment, the BS performs the sensing measurement twice, and the high level node performs the spectrum reallocation flow; and no further description is needed.

Figure 8:
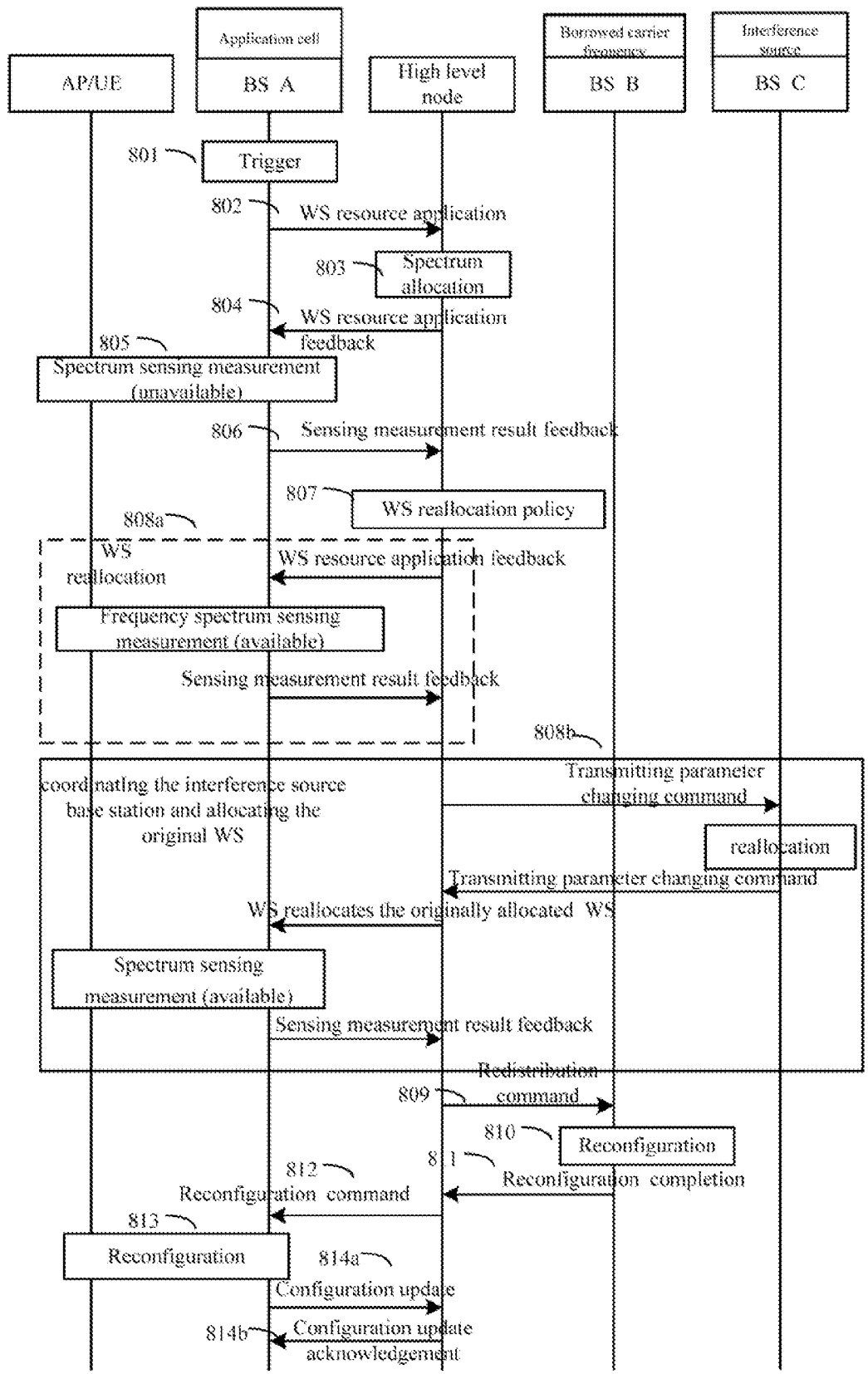
FIG. 8 shows a flow chart of borrowing and configuring frequency spectrum among different regions of the same system in the method embodiment 7.

Method embodiment 7: the flow of borrowing and configuring spectrum among different regions of the same system is shown as FIG. 8: and the embodiment is described below in detail.

The spectrum borrowing situations among different systems are described in the first six method embodiments, namely each secondary system borrows the WS resources of the authorization system; in the similar way, the disclosure is also suitable for the situation of borrowing the spectrum among different regions in the same system; at this time, the high level node includes the service condition information of the spectrum resources of each region of the system, the load state information of the spectrum resources of each region of the system and the communication quality situation information of the spectrum resources of each region of the system. The high level node may coordinate the relative interference source according to the interference source information in the result of the sensing measurement fed back by the low level node and formulate the corresponding spectrum allocation policy.

For example, two GSM cells A and B, the region A has heavier load or worse communication quality; the BS in the cell A is triggered to transmit a carrier frequency application to the high level node; the high level node, including the use information and the load information of each cell, discovers that the load of the current cell B is light, decides to allocates a carrier frequency of the B to the A for reconfiguration, and transmits the sensing measurement threshold to $T_2$ the A; the threshold is preset considering the interference caused by the reason that the B still works on the borrowed carrier frequency; the BS of the cell A and the subordinate node having the sensing capacity of the BS perform the frequency spectrum sensing measurement on the carrier frequency allocated by the high level node, judge whether the allocated carrier frequency meets the working requirements of the BS of the cell A located; if the allocated carrier frequency meets the working requirements of the BS of the cell B, the high level node transmits a reallocation command to the BS of the cell B, namely jumps the Steps 7 and 8, and transmits a reconfiguration executing command to the base station of the cell A after the completion of the reconfiguration: the cell A finishes the reconfiguration and transmits a configuration updating cell message to the high level node; and the high level node replies a configuration update acknowledgement message.

When the result of the sensing measurement is unavailable, the high level node has two preferable spectrum allocation policies:

the carrier frequency resources are reallocated to the BS A, and the A performs the sensing measurement flow again;

the high level node adjusts the transmitting parameters of the relative interference source according to the information of the interference source BS C in the result of the sensing measurement to reduce the interference generated on the WS of the interference source; and after the adjustment of the transmitting parameters of the relative interference source are completed, the original carrier frequency resources are allocated to the BS A.

After the available carrier frequency resources are found, the high level node transmits a reconfiguration command to the BS B and releases the specified carrier frequency; the BS B executes the reconfiguration, feeds back a reconfiguration completion message to the high level node; the high level node transmits the reconfiguration command to BS A to add the carrier frequency; after the completion of BS A reconfiguration, the configuration update message is fed back to the high level node; and the high level node feeds back the configuration update acknowledgement message.

Figure 9:
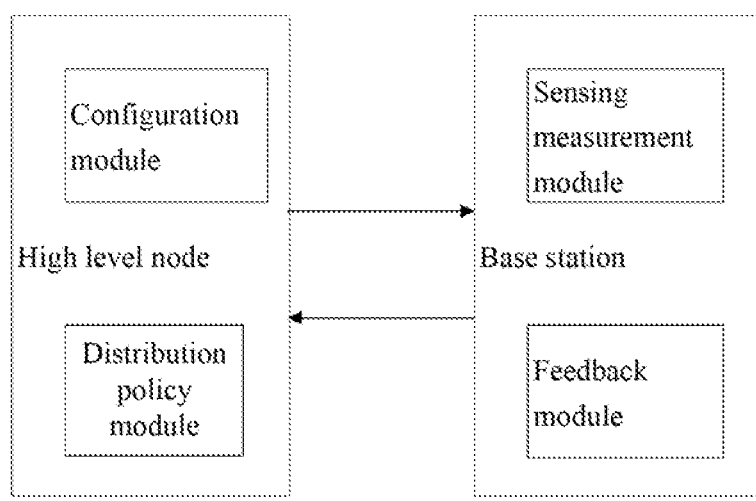
FIG. 9 shows a structural schematic diagram of a sensing aiding system for cognitive radio according to the disclosure.

FIG. 9 shows the structural schematic diagram of a sensing aiding system for cognitive radio according to the disclosure. As shown in FIG. 9, the system includes a high level node and a BS, wherein the high level node is configured to transmit configuration information to the BS, and formulate a corresponding WS allocation policy according to a result of the frequency spectrum sensing measurement fed back by the BS; and the BS is configured to perform the frequency spectrum sensing measurement in combination with the subordinate node having sensing capability of the BS and feeding back the result of the sensing measurement to the high level node.

Further, the high level node also includes a configuration module and a allocation policy module, wherein the configuration module is configured to configure the WS resources according to an WS resource application transmitted by the BS, the information of the WS resources stored by the BS, and the WS allocation policy, and feed back the WS resources to the BS.

Specifically, the configuration information includes: the information of the WS resources of the base station, or the information of the WS resources of the base station and co-channel or adjacent-channel system information of the WS.

The allocation policy module is configured to formulate the corresponding WS allocation policy according to the result of the frequency spectrum sensing measurement fed back by the BS.

When the allocated WS resources are unavailable, the corresponding spectrum allocation policy formulated by the allocation policy module includes:

transmitting the new WS resource information to the BS, and allocating the new WS resources to the BS; or In the above, the result of the sensing measurement includes the unavailability of the WS resources and the interference source information;

when the interference information is indeed from a co-channel and adjacent-channel system, the high level node transmits a transmitting parameter changing command to the interference source BS which causes the WS interference; the interference source BS executes the command of the high level node and feeds back the transmitting parameter changing command response to the high level node; the high level node retransmits a command of allocating the original WS resources continuously to the BS which transmits the resource application, wherein the interference source information is included in the result of the sensing measurement; and the transmitting parameter changing command is used to limit the transmitting power of the BS or change one or more antenna parameters; or When the interference on the WS is an unexpected interference and the information of the interference source cannot be distinguished, the high level node stores the information of the interference source and reduces the priority level for allocating the resources on the base station in subsequent resource allocation.

The BS further includes a sensing measurement module and a feedback module, wherein the sensing measurement module is configured to perform the sensing measurement in combination with the subordinate node having the sensing capacity of the BS, judge whether the WS resources meet a threshold value preset by the BS, and determine whether the WS resources are available; and the feedback module is configured to feed the result of the frequency spectrum sensing measurement to the high level node, wherein the frequency spectrum sensing measurement is performed by the base station combining with its subordinate node having the sensing capacity.

The result of the sensing measurement of the sensing measurement module includes availability of the WS resources, or unavailability of the WS resources and the information of the interference source.

When the result of the sensing measurement of the WS resources is judged as unavailability, the result of the sensing measurement also includes the interference source information, and the result of the sensing measurement is fed back to the high level node.

The above is only the preferred embodiment of the disclosure and not intended to limit the disclosure.

What is claimed is:

1. A sensing aiding method for cognitive radio, comprising:
    a high level node transmitting configuration information to a base station;
    the high level node receiving a result of a sensing measurement from the base station, wherein the result of the sensing measurement is corresponding to the configuration information;
    wherein the configuration information comprises the information of White Spaces (WS) resources of the base station, co-channel, and adjacent-channel system information of the WS;
    the high level node formulating a corresponding WS allocation policy according to the received result of the sensing measurement;
    wherein formulating the corresponding WS allocation policy when the WS resources of the base station which are allocated are unavailable comprises:
    when the base station continues using the WS resources of the base station which are allocated, the high level node coordinating an interference source related by the frequency spectrum allocation policy formulated by the high level node according to the information of the interference source provided by the result of the sensing measurement;
    the high level node transmitting new information of the WS resources to the base station and
    when an interference on the WS is an unexpected interference and the information of the interference source indistinguishable, the high level node storing the information of the interference source and reducing a priority level for allocating resources on the base station in subsequent resources allocation.

2. The method according to claim 1, wherein the WS resources refer to unoccupied frequency spectrum resources; the information of the WS resources comprises a frequency point, bandwidth, transmitting parameter requirements and sensing measurement threshold information; and
    the co-channel and adjacent-channel system information of the WS comprises pilot information of a system, and modulating and coding mode information of the system, wherein the system occupies co-channel and adjacent-channel resources of the WS.

3. The method according to claim 1, wherein the result of the sensing measurement comprises availability of the WS resources or unavailability of the WS resources, and the information of the interference source.

4. The method according to claim 1, wherein the step of the high level node coordinating the interference source related by the frequency spectrum allocation policy formulated by the high level node according to the information of the interference source provided by the result of the sensing measurement, and the base station continuing using the WS resources which are allocated is embodied as: if the information of the interference source is indeed from a co-channel and adjacent-channel system, the high level node transmitting a transmitting parameter changing command to an interference source base station which causes an WS interference; the interference source base station executing the command of the high level node and feeding back a transmitting parameter changing command response to the high level node; and the high level node retransmitting a command of allocating the original WS resources continuously to the base station which transmits a resource application;

wherein the transmitting parameter changing command limits transmitting power of the transmitting parameter changing command or changes antenna parameters.

5. The method according to claim 4, wherein the new information of the WS resources comprises: one or more frequency points of the reallocated WS resources, one or more bandwidths of the reallocated WS resources, sensing measurement threshold information of the reallocated WS resources and one or more transmitting parameter requirements of the reallocated WS resources.

6. A high level node, comprising a processor configured to execute the following modules:

a configuration module, configured to transmit configuration information to a base station;

an allocation policy module, configured to formulate a corresponding White Spaces (WS) allocation policy according to a result of spectrum sensing measurement fed back by the base station;

wherein the configuration module is configured to configure WS resources to the base station according to an application of the WS resources transmitted by the base station, the information of the WS resources stored by the base station, and the WS allocation policy, and feedback the WS resources to the base station;

wherein the configuration information comprises the information of the WS resources of the base station, co-channel, and adjacent-channel system information of the WS; and the allocation policy module is configured to formulate the corresponding WS allocation policy according to the result of the frequency spectrum sensing measurement fed back by the base station;

wherein the corresponding WS allocation policy formulated by the allocation policy module, when the allocated WS resources are unavailable comprises:

when new WS resources are needed, the allocation policy module transmitting the new WS resource information to the base station, and allocating the new WS resources to the base station;

when interference information is from the co-channel and adjacent-channel system, the high level node transmitting a transmitting parameter changing command to an interference source base station which causes an WS interference; the interference source base station executing the command of the high level node and feeding back the transmitting parameter changing command response to the high level node; and the high level node retransmitting a command of allocating the original WS resources continuously to the base station which transmits a resource application, wherein the interference source information is comprised in the result of the sensing measurement; and the transmitting parameter changing command limits transmitting power of the base station or changes one or more antenna parameters; and when an interference on the WS is an unexpected interference and the information of the interference source indistinguishable, the high level node storing the information of the interference source and reducing a priority level for allocating resources on the base station in subsequent resources allocation.

\* \* \* \* \*